May 22, 1923.

W. G. PEACOCK

SAW SUPPORT

Filed May 16, 1922

1,456,192

INVENTOR
WILLIAM G. PEACOCK.

BY *E. K. Bond*

ATTORNEY.

Patented May 22, 1923.

1,456,192

UNITED STATES PATENT OFFICE.

WILLIAM G. PEACOCK, OF ENDERBY, BRITISH COLUMBIA, CANADA.

SAW SUPPORT.

Application filed May 16, 1922. Serial No. 561,443.

*To all whom it may concern:*

Be it known that I, WILLIAM G. PEACOCK, a citizen of Dominion of Canada, and resident of Enderby, in the county of Yale and Province of British Columbia, Dominion of Canada, have invented certain new and useful Improvements in Saw Supports, of which the following is a specification.

This invention has relation to certain new and useful improvements in a saw support and has for its primary object the provision of a support which may be readily attached to a tree to support one end of a saw and thereby facilitate the operation of felling a tree.

The invention has for another object the provision of a saw support of the character stated which will be of such construction as to make it possible for a single sawyer to saw down or fell trees which ordinarily require two sawyers operating opposite ends of the saw.

The invention has for a further object the provision of a saw support of the character stated which will be of simple and inexpensive construction, will be strong and durable and may be readily attached to, or removed from a tree trunk, as desired.

With the foregoing and other objects in view as will appear as the description proceeds the invention consists in the novel construction, combination and arrangement of co-operating elements as hereinafter more specifically set forth, claimed and shown in the accompanying drawings forming a part of the present application, in which:

Figure 1:
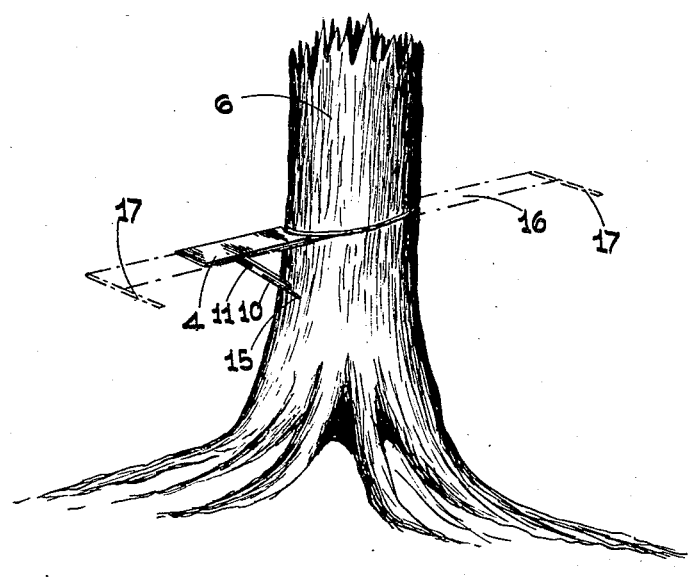
Figure 1 is a perspective view of the support in use.

Referring more in detail to the drawings, in which similar reference characters designate corresponding parts throughout the several views, the numeral 4 designates the body of the support which may be in the form of a board or plank, as shown and which has an inwardly grooved forward end 5 for engagement around a portion of a tree trunk 6, as indicated in Figure 1.

Figure 2:
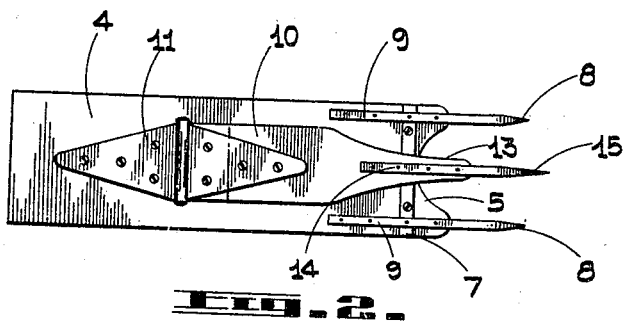
Figure 2 is a bottom plan view of the support, removed.
Figure 3:
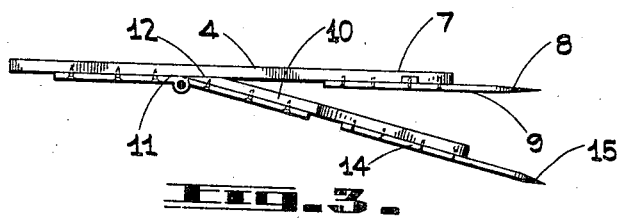
Figure 3 is a side elevation of the support.

In order to re-inforce the body 4 a transverse re-inforcing member 7 is countersunk in the under face thereof adjacent the forward end 5. This may be readily seen by referring to Figures 2 and 3. In order to position the body member 4 on the tree trunk, a pair of tree trunk engaging fingers 8 are provided and have their outer ends tapered to sharp points. These fingers 8 are formed on the extended forward ends of the finger bars 9 secured on the under face of the body member 4 in parallel relation and at the forward end portion of said body member 4. The tree trunk engaging fingers 8 may be extended to opposite sides of the tree trunk 6 and driven into the same to attach the body member 4 to the tree trunk 6, as shown in the drawings. In order to brace the body member 4, a hinged bracing leg 10 is provided and carried by the hinge member 11 which has one section secured to the end face of the body member 4 outwardly of the longitudinal center of said body member 4. The bracing leg 10 has a bevelled upper end 12 which may be engaged with the end face of the body member 4 when the supporting leg 10 is nearly parallel with the body member 4 or in its folded position, as shown in Figure 3. The supporting leg 10 has its free end reduced, as shown at 13 and a pointed tree engaging member 14 is secured to the under face of the reduced end 13, as shown in Figures 2 and 3. This pointed tree engaging member 13 has its free pointed end 15 extended a sufficient distance beyond the reduced forward end 13 of the supporting leg 10 to enter the tree trunk 6, as indicated in Figure 1, and thereby firmly support the body member 4 in proper position.

It is believed the complete construction and operation of the saw support may now be apparent to parties familiar with this art without further detailed description. It may be briefly stated, however, that after the support is properly mounted on the tree trunk 6, the body member 4 will serve as a shelf for one end of the conventional form of saw 16, as shown in Figure 1, which saw 16 is designed to be normally operated by two sawyers, one sawyer at each end to operate it by means of the end handles 17 thereof. When employing this saw support, however, the saw 16 may be operated by one sawyer at one end of the saw, while the remaining end of the saw rides over the body member 4, as indicated in the drawings. This saw support is of special advantage when working on a hillside where it is difficult for two sawyers to work together.

While the preferred embodiment of the invention has been disclosed it is to be understood that minor changes in the details of construction and arrangement of parts may be resorted to within the scope of what is claimed without departing from the spirit of the invention.

What I claim as new is:

1. A saw support comprising a body member having one end formed for engagement around a tree trunk, means extended from the said end of the body member for attaching the latter to the tree trunk and a bracing member carried by said body member provided with a tree trunk penetrating extension.

2. A saw support comprising a body member having an inwardly grooved forward end for engagement around a tree trunk, means for reinforcing said body member, tree trunk engaging fingers extended from said body member, a bracing member hingedly connected with said body member and a tree trunk penetrating extension member carried by said bracing member.

3. A saw support comprising a body member having one end formed for engagement around a tree trunk, a pair of tree trunk engaging fingers extending from said end of the body member at the edges thereof and pointed for engagement in the tree trunk, a bracing member, means hingedly connecting said bracing member with said body member and a pointed tree trunk penetrating extension carried by said bracing member and projecting from the free end thereof, the free end portion of the bracing member being reduced in width and extended together with the tree trunk penetrating extension between the tree trunk engaging fingers when said bracing member is folded toward said body member, the hinged end of said bracing member being bevelled to permit folding of the bracing member toward said body member.

In testimony whereof, I affix my signature.

WILLIAM G. PEACOCK.